(12) United States Patent
Marroquin et al.

(10) Patent No.: US 8,732,526 B1
(45) Date of Patent: May 20, 2014

(54) SINGLE-WIRE DATA INTERFACE FOR PROGRAMMING, DEBUGGING AND TESTING A PROGRAMMABLE ELEMENT

(75) Inventors: Jesse Marroquin, Plano, TX (US); Zachary Noel Metzinger, Wylia, TX (US); Donald Allen Pearce, Austin, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 385 days.

(21) Appl. No.: 13/168,414

(22) Filed: Jun. 24, 2011

(51) Int. Cl.
*G06F 11/00* (2006.01)

(52) U.S. Cl.
USPC .......................................................... 714/27

(58) Field of Classification Search
None
See application file for complete search history.

(56) References Cited

U.S. PATENT DOCUMENTS

| | | | |
|---|---|---|---|
| 7,496,813 B1 * | 2/2009 | Houlihane et al. | 714/724 |
| 7,565,576 B2 * | 7/2009 | Seroff | 714/27 |
| 7,584,381 B2 * | 9/2009 | Kudo | 714/30 |
| 7,743,294 B2 * | 6/2010 | Harrod et al. | 714/724 |
| 2006/0242501 A1 * | 10/2006 | Kimelman et al. | 714/724 |

OTHER PUBLICATIONS

Ashfield et al., "Serial Wire Debug and the CoreSight TM Debug and Trace Architecture", ARM Ltd, 2009.*
ARM Debug Interface v5 Architecture Specification, ARM Limited, 2006.*
Michael Williams, "Low Pin-count Debug Interfaces for Multi-device Systems", ARM Limited, 2009.*

* cited by examiner

*Primary Examiner* — Michael Maskulinski
(74) *Attorney, Agent, or Firm* — North Weber & Baugh LLP

(57) ABSTRACT

Various embodiments of the present invention relate to systems, devices and methods of employing a single-wire data interface to program, debug and test a programmable element. A 1-WireLoader system comprises a programming entity, a physical-layer interface device, a single signal wire and the programmable element. The programming entity generates a command sequence comprising a plurality of commands. Each command in the plurality of commands is associated with a data in a plurality of data. The physical-layer interface device is coupled directly to the programming entity, and indirectly to the programmable element via a single signal wire. A single pin is involved at the interface of the programmable element single pin to receive commands from and exchange data with the programming entity. Commands and associated data are time-multiplexed to a serial signal according to a data sequence protocol, and communicated between the programming entity and the programmable element via the single-wire data interface, efficiently reducing the pin count at an interface of the programmable element. In some embodiments of the 1-WireLoader system, this single pin is multiplexed with a reset I/O pin while not interfering with normal operation of the system reset signal.

23 Claims, 11 Drawing Sheets

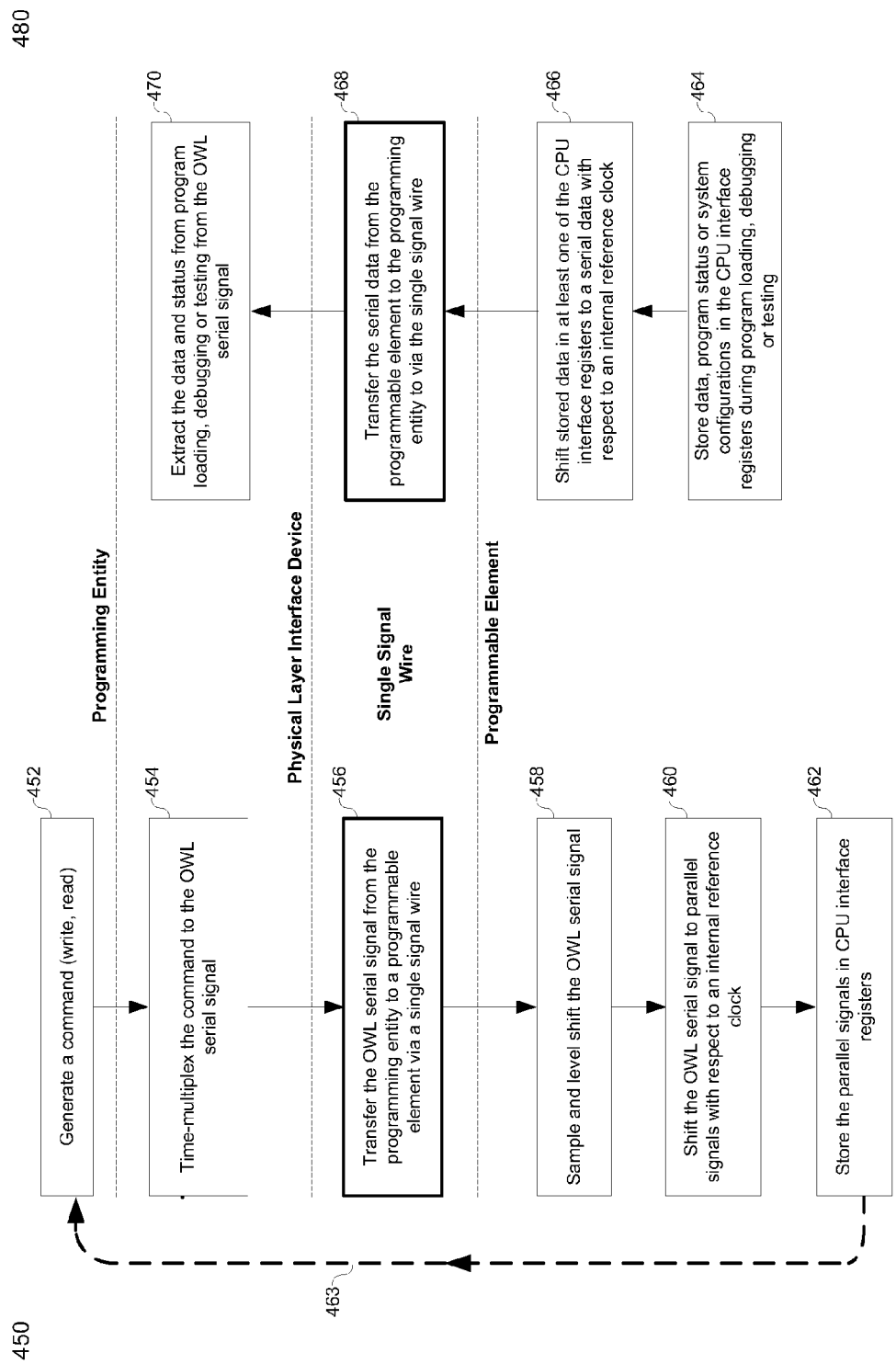

SINGLE-WIRE DATA INTERFACE FOR PROGRAMMING, DEBUGGING AND TESTING A PROGRAMMABLE ELEMENT

BACKGROUND

A. Technical Field

The present invention relates generally to integrated circuits, and more particularly to methods, systems and devices of employing a single-wire data interface to program, debug and test a programmable element. Commands and associated data are time-multiplexed to a serial signal according to a data sequence protocol, and communicated between a programming entity and the programmable element via the single-wire data interface, efficiently reducing the pin count at an interface of the programmable element.

B. Background of the Invention

Integrated circuits incorporate millions of transistors on small chips to implement complicated functions, and are used in almost all electronic equipment and appliances today. For instance, a microprocessor is a single integrated circuit that incorporates computational functions of a central processing unit (CPU) in a computer. A microcontroller is another exemplary integrated circuit functioning as a main processing core that may be used to control an embedded system that performs one or several specialized functions. Microprocessors and microcontrollers account for almost all processors encountered in daily life, and have spanned all aspects of modern life, e.g., desktop computers, laptop computers, cellular phones, music players, global positioning system (GPS), washing machines, remote controls, motor controllers and medical imaging systems.

Many integrated circuits are programmable, and need an interface over which program codes are loaded, debugged, and tested. Sometimes, this interface may be applied to verify the integrated circuits as well. The program codes are stored in simple flip-flops or more complex memories, such as a non-volatile flash memory, in the integrated circuits. The interface needs to be compatible with the integrated circuits such that the program codes may be successfully loaded, and subsequently debugged and tested over it.

Joint Test Action Group (JTAG) Test Access Port, Serial Peripheral Interface (SPI), Inter-Integrated Circuit (I2C), Universal Serial Bus (USB) and synchronous serial data links are some interfaces widely employed for program loading, debugging and testing in various integrated circuits. Each of these interfaces requires multiple signals at the interface of an integrated circuit and its associated IC package. These signals are typically multiplexed with other non-programming signals on multiple pins in a complex manner. As the chip size of the integrated circuit shrinks, such pin arrangement bottlenecks the chip size, package size and thus, cost efficiency.

FIG. 1 illustrates an exemplary block diagram 100 of a JTAG system for programming, debugging and testing a programmable integrated circuit (IC) 102. The JTAG system 100 comprises the programmable IC 102, a programming entity 104, and a JTAG emulation probe 106. The programmable IC 102 further comprises a JTAG test access port 108, an execution unit (e.g., a CPU core) 110, an internal memory 112, and a read-only memory (ROM) 114 that is attached to the execution unit 110.

The programming entity 104 is a generic personal computer (PC) or a dedicated programmer hardware that generates program codes for the programmable IC 102. The JTAG emulation probe 106 is coupled to the programming entity 104. The programmable IC 102 may be a microprocessor, a microcontroller, a state machine, or a field-programmable gate array (FPGA). In this programmable IC 102, the execution unit 110 is coupled to the JTAG test access port 108, and the internal memory 112 is coupled to the execution unit 110. Program codes are provided by the programming entity 104, and ultimately loaded into the internal memory 112 included in the programmable IC 102.

The programming IC 102 is directly coupled to the JTAG emulation probe 106, and thus indirectly to the programming entity 104, via a five-wire JTAG data interface. The five-wire JTAG data interface is associated with five pins (TDI, TDO, TCK, TMS and RESET) on the programmable IC 102 for five respective signals of test data in, test data out, test clock, test mode select and system reset. System reset (RESET) is mainly used for state control during program loading and debugging. As the programmable IC 102 scales down in size, these four pins in the JTAG data interface may not be spared without compromising programmability of this system. The JTAG data interface takes up valuable input/output (I/O) resources, such as chip area for I/O circuit, in addition to the pins at the interface of the programmable IC 102.

SUMMARY OF THE INVENTION

Various embodiments of the present invention relate to integrated circuits, and more particularly to methods, systems and devices of employing a single-wire data interface to program, debug and test a programmable element. Commands and associated data are time-multiplexed to a serial signal according to a data sequence protocol, and communicated between a programming entity and the programmable element via the single-wire data interface, efficiently reducing the pin count at an interface of the programmable element.

A 1-WireLoader system comprises the programming entity, a physical-layer interface device, a single signal wire, and the programmable element. The programming entity generates a command sequence comprising a plurality of commands. Each command in the plurality of commands is associated with a data in a plurality of data. The physical-layer interface device is coupled directly to the programming entity, and indirectly to the programmable element via a single signal wire. A single pin is involved at the interface of the programmable element to receive commands from and exchange data with the programming entity. In some embodiments of the 1-WireLoader system, this single pin is multiplexed with a reset I/O pin while not interfering with normal operation of the system reset signal.

A method of loading, debugging or testing program codes for a programmable element via a single-wire data interface includes three steps of identification, selection and communication. Commands and associated data involved in these steps are communicated according to a data sequence protocol between a programming entity and a programmable element. In the identification step, the programming entity interrogates the programmable element to determine the presence of the latter. In the selection step, the programmable element is selected by a device selection command, and configured to respond to a subsequent command sequence generated by the programming entity. In the communication step, the command sequence is communicated via a single-wire data interface according to the data sequence protocol, and thereafter, implemented sequentially in the programmable element. The command sequence comprises a plurality of commands each of which is associated with a data in a plurality of data. The plurality of data may include program codes to load, or data associated with program loading, debugging or testing.

Certain features and advantages of the present invention have been generally described in this summary section; however, additional features, advantages, and embodiments are presented herein or will be apparent to one of ordinary skill in the art in view of the drawings, specification, and claims. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 4C illustrates a exemplary data processing method of delivering the command sequence that is generated by the programming entity and used to control the programmable element according to various embodiments of the invention.

FIG. 4D illustrates an exemplary data processing method of reading data from the CPU interface registers in a 1-Wire-Loader system according to various embodiments of the invention.

DETAILED DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of structures. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily all referring to the same embodiment.

Furthermore, connections between components or between method steps in the figures are not restricted to connections that are effected directly. Instead, connections illustrated in the figures between components or method steps may be modified or otherwise changed through the addition thereto of intermediary components or method steps, without departing from the teachings of the present invention.

Figure 1:
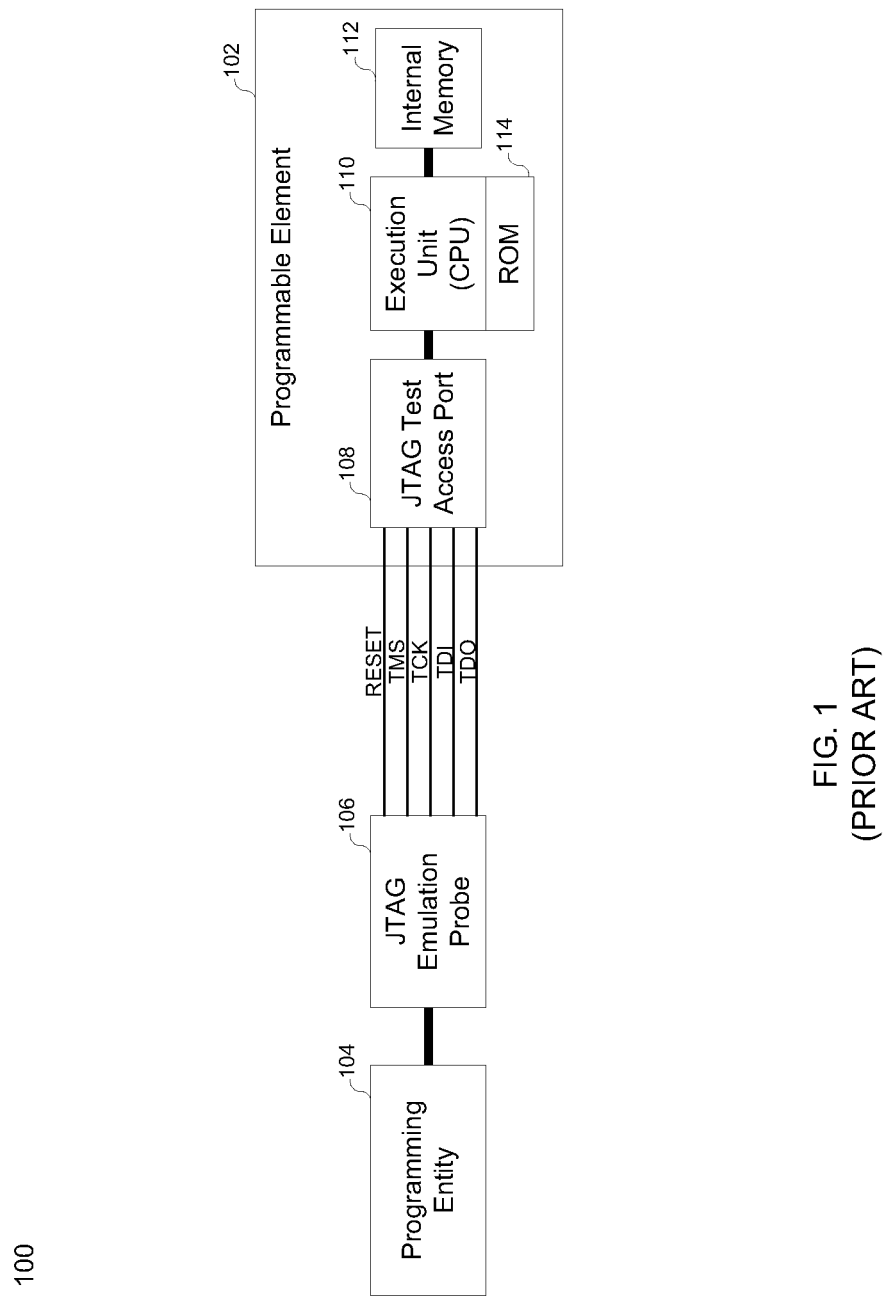
FIG. 1 illustrates an exemplary block diagram of a JTAG system for programming, debugging and testing a programmable integrated circuit (IC).
Figure 2:
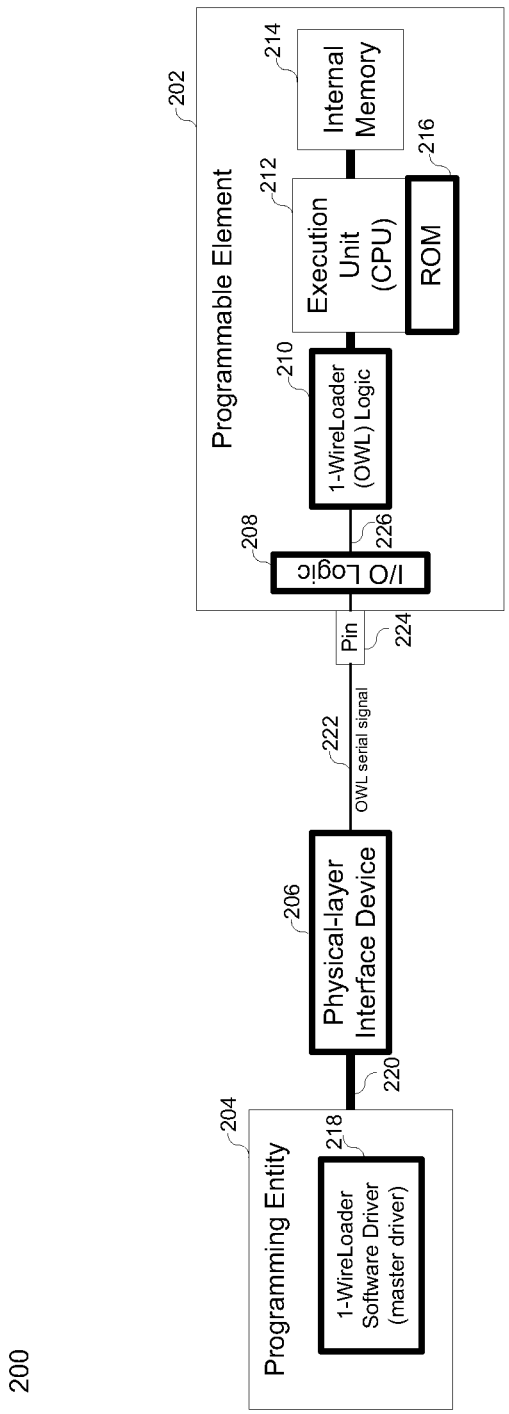
FIG. 2 illustrates an exemplary block diagram of a 1-Wire-Loader system that is used for programming, debugging and testing a programmable element based on a single-wire data interface according to various embodiments of the invention.

FIG. 2 illustrates an exemplary block diagram 200 of a 1-WireLoader system that is used for programming, debugging and testing a programmable element 202 based on a single-wire data interface according to various embodiments of the invention. The 1-WireLoader system 200 comprises the programmable element 202, a programming entity 204, a physical layer interface device 206 and a single signal wire. The programmable element 202 further comprises an input/output (I/O) logic 208, a 1-WireLoader (OWL) logic block 210, an execution unit 212, an internal memory 214, and a read-only memory (ROM) 216 that is attached to the execution unit 212. The programming entity 204 further comprises a 1-WireLoader software driver 218.

In this 1-WireLoader system 200, the programming entity 204 issues commands to load program codes to the internal memory 214, debug and test program codes in the execution unit 212. A data is associated with each command, and exchanged between the programming entity 204 and the programmable element 202. During program loading, write commands are used to send data (i.e., program codes) to store in the internal memory 214. During program debugging, read commands are used to extract intermediate data or program status stored in the programming element 204 for further analysis. Similarly, while the programmable element 202 is tested, read commands are issued by the programming entity 204 to request results (e.g., data, status and configurations). Therefore, during this program loading, debugging and testing, both commands and data are communicated between the programming entity 204 and the programmable element 202 in this 1-WireLoader system 200.

Commands and associated data are time-multiplexed to a serial signal (e.g., an OWL serial signal 222) and communicated via the single wire data interface based on a data sequence protocol. The data sequence protocol is used to define characteristics for communication of command and data via this single-wire data interface. The data sequence protocol may be proprietary or adapted from an existing protocol. In certain embodiments, the data sequence protocol is adapted from one-wire bus architecture that enables write-zero, write-one and reset operations to a portable data module. Data initialization, delay and format may be defined in the data sequence protocol.

In various embodiments of the invention, the programming entity 204 is a personal computer (PC), a microcontroller, or any digital programmer hardware that is capable of generating program codes for the programmable element 202. The 1-WireLoader software driver 218 resides within the programming entity 204, generates the program codes, receives data, and issues command sequences to control program loading, debugging and testing. Therefore, the 1-WireLoader software driver 218 is a master driver that controls and coordinates the processes of loading and debugging the program codes in the programming element 202, and testing the programming element 202 based on the loaded program codes.

In certain embodiments, the physical layer interface device 206 is coupled to the programming entity 204. The physical layer interface device 206 converts the command sequence from the 1-WireLoader software driver 218 to the OWL serial signal 222 that may be transferred to the programmable element 202 via the single signal wire. In addition to command conversion, the physical layer interface device 206 implements bidirectional data conversion between the programming entity 204 and the programmable element 202.

One of those skilled in the art also realizes that the single signal wire is referenced to the ground, while communicating the OWL serial signal 222 to the physical-layer interface device 206. It is also obvious that a differential-mode signal may be created from the single-ended OWL serial signal 222, and in this case, the ground reference is not needed. However, the differential-mode signal involves two wires, and increases the number of pins for communicating the OWL serial signal 222 to two at the interface of the programmable element 202.

In certain embodiment, the physical layer interface device 206 is connected to the programming entity 204 using a USB interface at one end, and connected to the programmable element 202 via the single signal wire at the other end. The command sequence and program codes are thus transferred via conventional USB data packets 220 and converted to the OWL serial signal 222 in the physical layer interface device 206. Similarly, returned data from the programmable entity 202 are converted from the OWL serial signal 222 to USB data packets 220 in the physical-layer interface device 206. The OWL serial signal 222 follows the data sequence protocol. In certain embodiments, the physical layer interface device 206 is integrated as an interface module inside the programming entity 204.

The programmable element 202 may be an integrated circuit or an electronic system that is programmable. Exemplary programmable elements 202 include a microprocessor, a microcontroller, a state machine, and a field-programmable gate array (FPGA). The execution unit 212 in the programmable element 202 may be a CPU core in a conventional microprocessor or microcontroller. The ROM 216 is attached to the execution unit 212 to directly provide built-in operation programs, and however, these built-in programs are pre-loaded prior to shipping and not programmable.

A new operation program may be loaded in the internal memory 214 and executed by the execution unit 212. The internal memory 214 is a non-volatile flash memory that is programmable. Program codes associated with the new operation program are provided by the programming entity 204; and once being loaded in the internal memory 214, the new operation program may be debugged and tested in the execution unit 212 under the control of the programming entity 204.

The programmable element 202 is coupled to the physical layer interface device 206 via the single signal wire. A single pin 224 is involved at the interface of the programmable element 202 to couple the OWL serial signal 222. The I/O logic 208 in the programmable element 202 is directly coupled to receive the OWL serial signal 222. The I/O logic 208 pre-processes the OWL serial signal 222 during program loading, and in various embodiments of the invention, the I/O logic 208 may sample the OWL serial signal 220, and/or shift the signal to voltage levels that are consistent with the programmable element 202. The data sequence protocol remains applicable to a processed OWL serial signal 226. The I/O logic 208 also drives the single pin 224 to allow data to be returned to the physical-layer interface device 206 and programming entity 204.

The OWL logic 210 is coupled to both the I/O logic 208 and the execution unit 212 with the attached ROM 216. During program loading, the OWL logic 210 receives the processed OWL serial signal 226, and generates control and data signals. In particular, commands and program codes may be associated with control and data signals, respectively. The execution unit 212 may subsequently take over and load the data signals (i.e., program codes) to the internal memory 214 according to the control signals. Similarly, once a read command is received by the OWL logic 210, data from program loading, debugging and testing may also be time-multiplexed to the OWL serial signal 226 in the OWL logic 210 and returned to the master driver in the programming entity 204. Therefore, the OWL logic 210 forms a link between the master driver, i.e., the 1-WireLoader software driver 218 in the programming entity 204, and the execution unit 212 in the programmable element 202.

Figure 3:
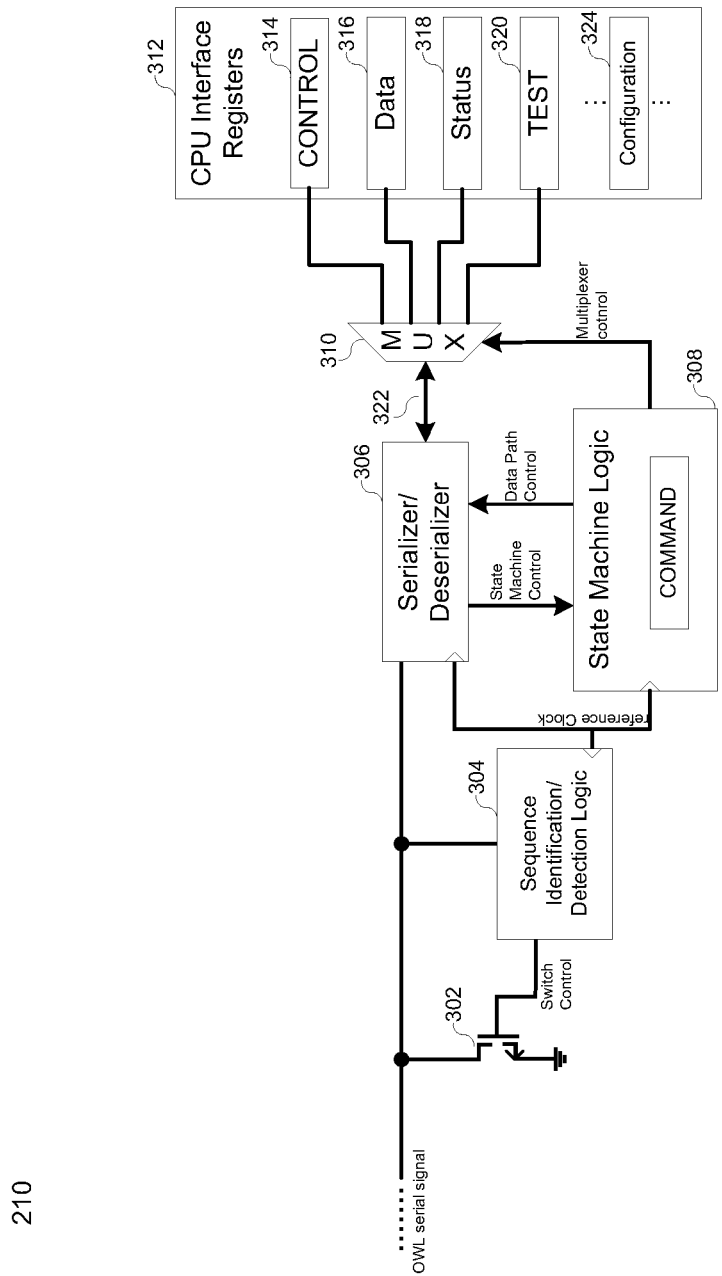
FIG. 3 illustrates an exemplary block diagram of a 1-Wire-Loader (OWL) logic according to various embodiments of the invention.

FIG. 3 illustrates an exemplary block diagram of a 1-WireLoader (OWL) logic 210 according to various embodiments of the invention. The OWL logic 210 comprises a switching transistor 302, a sequence identification/detection logic 304, a serializer/deserializer 306, a state machine logic 308, a multiplexer 310, and CPU interface registers 312. The OWL logic 210 functions as a bidirectional signal conditioning circuit between the master driver 218 and the execution unit 212 within the programmable element 202.

The sequence identification/detection logic 304 is coupled to receive the OWL serial signal 226 and an internal reference clock. The OWL serial signal 226 is synchronized with the reference clock. The logic 304 detects the presence of the programming entity 204 when a particular signal pattern appears in the OWL serial signal 226. Furthermore, the logic 304 switches a switch control from low to high to short the OWL serial signal 222 to the ground in order to acknowledge the presence of the programmable element 202 In one embodiment, the particular signal pattern indicating the presence of the programming entity 204 is the OWL serial signal 222 being pulled down to the ground for a certain number of clock cycles.

The switching transistor 302 is coupled to receive both the OWL serial signal 226 and the switch control generated by the logic 304. If the switch control is high, the OWL serial signal 226 is shorted to the ground such that the data path in the 1-WireLoader system 200 is interrupted. However, if the switch control is low, the data path is open, and data may be delivered to or received from the serializer/deserializer 306.

The serializer/deserializer 306 is a bidirectional data converter coupled to receive the OWL serial signal 226, the reference clock, and a parallel data 322. In reference to the reference clock, the OWL serial signal 226 may be shifted to a parallel data 322 comprising multiple parallel signals, and the parallel data 322 comprising multiple parallel signals may also be shifted to generate the single-wire OWL serial signal 226. The direction of the data path is determined by a data path control provided by the state machine logic 308.

The multiplexer 310 is coupled to receive the multiplexer control from the state machine logic 308, and the multiplexor 310 functions as a bidirectional data path between the CPU Interface Registers 312 and the serializer/deserializer 306. Signals may be selected from the parallel data 322 to store in one of the CPU interface registers 312, and similarly, one signal may be extracted from one of these registers 312 for parallel-to-serial data conversion in the serializer/deserializer 306.

The state machine logic 308 is coupled to receive the reference clock, a state machine control from the serializer/deserializer 306, and generates the data path control and a multiplexer control to determine data conversion in the serializer/de-serializer 306 and multiplexing in the multiplexer 310, respectively. In particular, the state machine logic 308 incorporates the data sequence protocol used in the single-wire data interface, and generates the data path or multiplexer controls based on the OWL serial signal 226.

In one embodiment, the data sequence protocol includes a sequence of commands, and associates each command with a data that follows the command. The state machine logic 308 sequentially determines the data path and multiplexer controls for these commands and data in accordance with the protocol. When a write command is received, a deserializer 306 is enabled for the subsequent data to generate the parallel data 322, and the multiplexer 310 is enabled to store the parallel data 322 to at least one register selected from the CPU interface registers 312. When a read command is received, the multiplexer 310 is enabled to select data in at least one register in the registers 312 as the parallel data 322, and a serializer is enabled to convert the parallel data 322 to the OWL serial signal 226.

Among the CPU interface registers 312, the control register 314 and the data register 316 are two standard registers. The control register 314 is read and written according to the OWL serial signal 222 provided by the master driver 218, and particularly, not accessible to the execution unit 212 in the programmable element 202. Thus, state of the programmable element 202 may be manipulated by the master driver 218 via the control register 314. The data register 316 serves as a bi-directional communication pathway between the ROM 216 and the master driver 218. During program loading, program codes are temporarily stored in the data register 316 prior to being written to the internal memory 214, and during program debugging and testing, intermediate data from the execution unit 212 are also temporarily stored in this data register 316 prior to being sent to the programming entity 204 for further analysis.

In certain embodiments, both the control and data registers 314 and 316 are 16 bits wide. The lower 8 bits of the data register 316 may be written according to both data from the programming entity 204 and the programmable element 202. However, the upper 8 bits of the data register 316 are used for storing status signals, and particularly, during a handshaking process between the master driver 218 and the execution unit 212.

In addition to the control and data registers 314 and 316, the CPU interface registers 312 may further comprise a status register 318, a test register 320, and a configuration register 324. The status register 318 is reserved to store flag signals indicating program status. In various embodiments, the status register 318 may include common flags, such as zero, carry, overflow and parity. The test register 320 is associated with some particular tests, and used to store data resulting from these tests. The configuration register 324 is employed to temporarily store configurations of the execution units 212 upon running certain programs. Although the control and data registers 314-316 are commonly used in an OWL logic 210, alternative registers may also be used to further enhance the performance of program loading, debugging and testing.

The reference clock is generated internally in the programmable element 202, and has a fixed known frequency that is accurately controlled with a small error. The reference clock is normally generated from an existing oscillator within the programmable element 202. The OWL serial signal 222 is generated from commands and associated data according to this reference clock, and therefore, the OWL serial signal 222 is synchronous with the reference clock. In certain embodiments, the frequency of the reference clock is 1 MHz or 6 MHz. Commands and data are processed at a rate of 200 kilo-bits/second or 1 mega-bits/second.

It is a challenge to accurately recover the commands and associated data from the OWL serial signal 222 when the reference clock is associated with considerable frequency drifts and jitter noises. In one embodiment, the reference clock has a frequency of 1 MHz, and the jitter noise of this reference clock is controlled within 10 nsec in order to accurately implement a command sequence including ten 16-bit commands. Furthermore, the sequence identification/detection logic 304, the serializer/deserilizer 306 and the state machine logic 308 may be designed to address this concern.

Figure 4A:
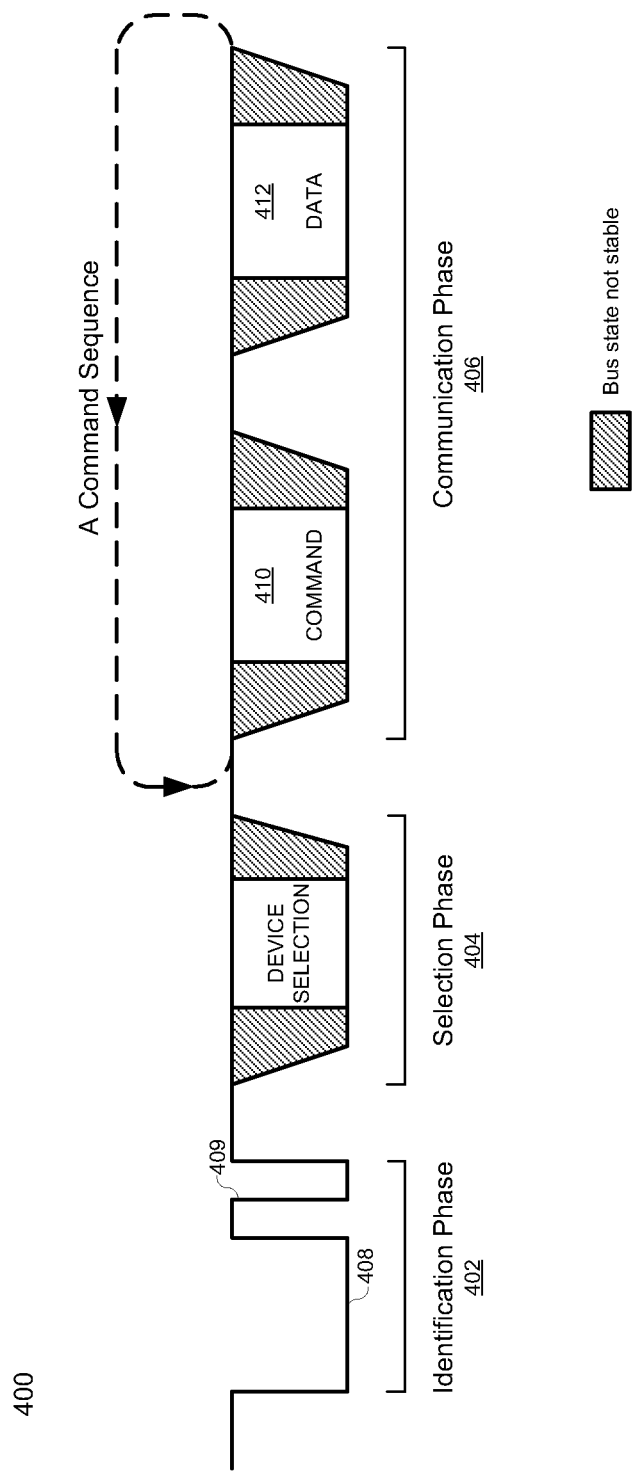
FIG. 4A illustrates an exemplary time diagram of an OWL serial signal that follows a data path protocol according to various embodiments of the invention.

FIG. 4A illustrates an exemplary time diagram 400 of the OWL serial signal 222 that follows a data path protocol according to various embodiments of the invention. The OWL serial signal 222 includes a command sequence that is generated by the programming entity 204. Based on the command sequence, program codes may be loaded, debugged or tested in the programmable element 202. The data sequence protocol is followed by the OWL serial signal 222 to identify/select the programmable element 204, and communicate both the command sequence and the associated data between the programming entity 204 and the programmable element 202. In various embodiments of the invention, the data sequence protocol is incorporated and controlled in the master driver 218 in the programming entity 204 and the OWL logic 310 in the programmable element 202, respectively.

In accordance with this exemplary data sequence protocol, the OWL serial signal 222 comprises three phases including an identification phase 402, a selection phase 404, and a communication phase 406. Two consecutive phases are separated by a number of data bits to allow the OWL serial signal 222 to stabilize between two phases. The number of data bits for phase separation is associated with the data sequence protocol, and in one embodiment, may be eight.

In the identification phase 402, the programmable element 202 and the programming entity 204 issue a respective flag signal sequentially onto the OWL serial signal 222, and acknowledge each other about presence and readiness for program loading, debugging or testing. In one embodiment, the identification phase 402 is initialized when the programming entity 204 pulls the OWL serial signal 222 down from high, its idle state, to low, and remains at low during an identification pulse 408 until the OWL serial signal 222 returns to high. This identification pulse 408 indicates that the programming entity 204 has a command sequence for the programmable element to implement. The programmable element 202 senses the identification pulse 408, waits for one bit period, and pulls down the OWL serial signal at a falling edge 409 to acknowledge its own presence to the programming entity 204. If the identification pulse 408 and the falling edge 409 is not detected prior to the end of the identification phase 402, the subsequent selection and communication phases 404 and 406 may not follow.

The OWL serial signal 222 is reset to high at the end of the identification phase 402 by the programmable element 202. In one embodiment, the width of the identification phase 402 is fixed as 16 bits. The pulse 408 lasts for a predetermined number of bits, e.g., eight bits. The falling edge 409 may be delayed from the pulse 408 for one or more bit periods. In another embodiment, the width of the identification phase 402 is not fixed. The identification phase 402 may be terminated, once the falling edge 409 is issued and detected.

In various embodiments of the invention, the sequence identification/detection logic 304 is used to detect the identification pulse, indicate the presence of the programmable element 202, and terminate the identification phase 402 in the programmable element 202.

In the selection phase 404, the programming entity 204 issues a device selection command to select the programmable element 202. In certain embodiments, more than one programmable element is included in the 1-WireLoader system, and each programmable element is associated with a device identification that may be included in the device selection command. The OWL logic 210 in the programmable element 202 is addressed according to the device identification in the device selection command, and configured to implement a command sequence for loading, debugging or testing the selected programmable element 202. The width of the selection phase 404 is fixed according to the data sequence protocol.

In the communication phase 406, the OWL serial signal 222 carries the command sequence from the programming entity 204 to the programmable element 202. Each command is associated with a data, and in particular, a write command is associated with a data provided by the programming entity 204. A read command is associated with a data that is sent back after the read command is received in the programmable element 202.

The communication phase 406 comprises a command phase 410 and a data phase 412. Each data included in the data phase 412 is associated with the command in the precedent command phase 410. In one embodiment, the command phase 410 includes a write command, and the data may be the program codes loaded to the internal memory 214. In another embodiment, the command phase 410 includes a read command, and the data may include program status requested by the programming entity 204 during a program loading, debugging or testing session.

The command and data phases 410 and 412 may recur until all commands in the command sequence are implemented. The width of each command or data phase is determined in the data sequence protocol. In one embodiment, the widths of both command and data phases are 16 bits. Two consecutive command and data phases are also separated by a fixed number of bits (e.g., 4 bits) to allow the bus state to stabilize.

Figure 4B:
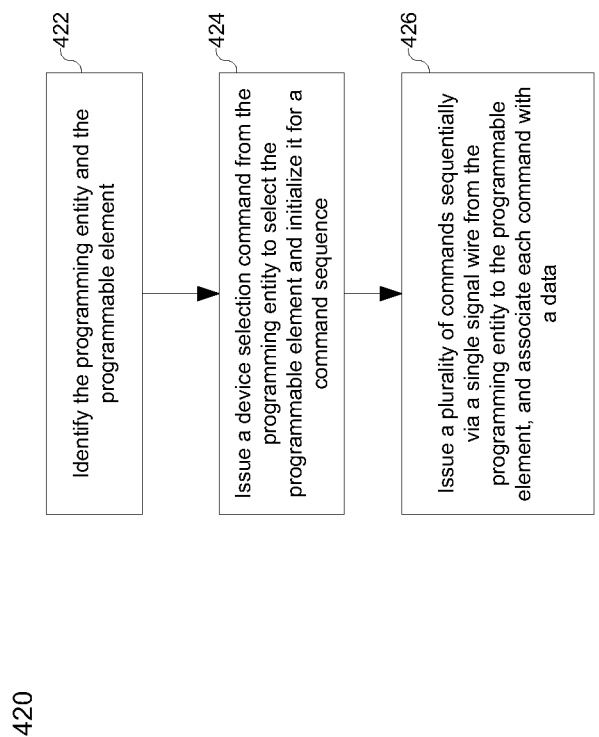
FIG. 4B illustrates an exemplary method of applying a single signal wire to program, debug and test a programmable element based on the data sequence protocol according to various embodiments of the invention.

FIG. 4B illustrates an exemplary method 420 of applying a single signal wire to program, debug and test a programmable element 202 based on the data sequence protocol 400 according to various embodiments of the invention. The method 420 comprises an identification step 422, a selection stage 424 and a communication step 426. At step 422, both the programmable element 202 and the programming entity 204 are identified. In one embodiment, the programming entity 204 and the programmable element 202 indicate their presence by sequentially generating the identification pulse 408 and the falling edge 409 on the OWL serial signal. At step 424, the programming entity 204 issues a device selection command to select the programmable element 202 and configure the OWL logic 210 for implementing the incoming command sequence.

At step 426, a plurality of commands is issued sequentially from the programming entity 204 to the programmable element 202 via a single signal wire. A plurality of data is also communicated with the plurality of commands on the signal wire. These commands are used to load programs into the internal memory 214, debug the programs, and test the programmable element 202 using the programs. Commands and associated data are time-multiplexed in the OWL serial signal 222 according to the data sequence protocol in FIG. 4A, and communicated via the single-wire data interface according to the data sequence protocol. In particular, each command is associated with a data, and this data may be written to or read from the programmable element 202. As a result, once steps 422, 424, and 426 are sequentially implemented, commands and data are integrated on the single-wire OWL serial signal according to the data sequence protocol for program loading, debugging and testing.

Both commands and data are transmitted between the programming entity 204 and the programmable element 202 in the communication phase 406 at step 426. The commands are generated by the master driver 218 in the programming entity 204 to control the programmable element 202. However, the data may be bidirectional. For a write command, the data accompanies the command, and is delivered from the programming entity 204 to the programmable element 202. For a read command, the data is extracted from the CPU interface registers 312, and transferred from the programmable element 202 to the programming entity 204.

FIG. 4C illustrates a exemplary data processing method 450 of delivering the command sequence that is generated by the programming entity 204 and used to control the programmable element 202 according to various embodiment of the invention. A command sequence is generated in the master driver 218 in the programming entity 204. The command sequence comprises a plurality of commands including write commands and read commands. In particular, each write command may be associated with a data that is delivered from the programming entity 204 to the programmable element 202. This data processing method 450 is also used to deliver a data associated with a write command. Steps 454-462 are repeated in a loop 463 until all commands in the command sequence are processed.

The command is generated by the programming entity 204 at step 542, and time-multiplexed to the OWL serial signal according to the data sequence protocol illustrated in FIG. 4A at step 454. At step 456, the OWL serial signal is transferred to the programmable element 202 via a single signal wire. At step 458, the OWL serial signal is sampled and level shifted. At step 460, the OWL serial signal is converted to parallel signals 322 with respect to an internal reference clock. The parallel signals 322 are associated with a plurality of control and data signals. At step 462, the plurality of control and data signals are stored in the CPU interface registers 312. Thereafter, the execution unit 212 implements the command according to the plurality of control and data signals.

FIG. 4D illustrates an exemplary data processing method 480 of reading data from the CPU interface registers 312 in a 1-WireLoader system according to various embodiments of the invention. The data processing method 480 is applicable when the programming entity 204 needs to verify the programs loaded to the internal memory 214, check the status from a previous command, and extract debugging or testing results. In particular, once a read command is processed and acknowledged according to FIG. 4C, the data processing method 480 is inserted into the loop 463 before step 452 to replace one cycle of command or data processing.

The CPU interface registers 312 are used to store both data for program loading and data associated with intermediate results, program status and system configuration at step 464. Once the write command is completed, some data about program status are also returned for storing in the CPU interface registers 312. When the command is associated with program debugging or testing, intermediate results, program status and system configurations may be stored in the CPU interface registers 312 and ready for a subsequent read command.

Once a read command is received in the programmable element 202, at least one stored data in the registers 312 is selected and converted to a serial data, i.e., the OWL serial signal, in reference to the internal reference clock at step 466. At step 468, the OWL serial signal is transferred through the single-wire data interface. At step 470, the OWL serial signal is recovered to data compatible with the master driver 318 according to the data sequence protocol. Therefore, the master driver 318 in the programming entity 204 receives the data stored in the CPU interface registers 312.

Figure 5A:
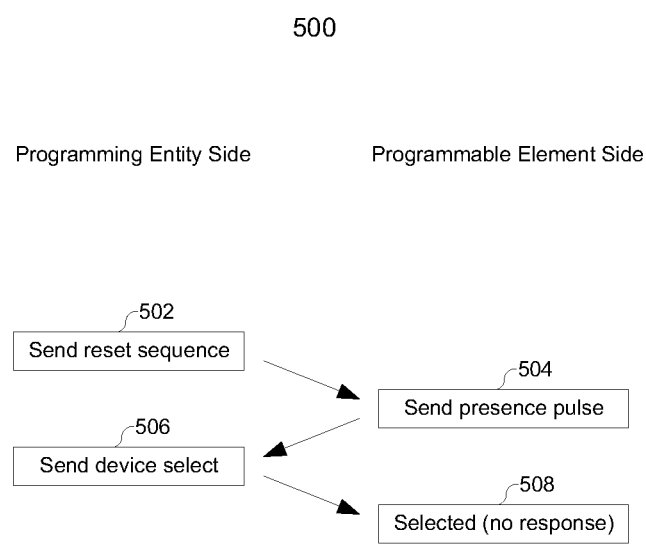
FIG. 5A illustrates an exemplary initial identification and selection step according to various embodiments of the invention.

FIG. 5A illustrates an exemplary initial identification and selection step 454 according to various embodiments of the invention. At step 502, the programming entity 204 sends a reset identification signal sequence 402 to the programmable element 202 which subsequently returns a presence pulse to confirm its presence at step 504. At step 506, the programming entity 204 selects the programmable entity 202 by sending a device selection command 404. At step 508, once being selected, the programmable element 202 is ready to receive communication phase commands and associated data.

Figure 5B:
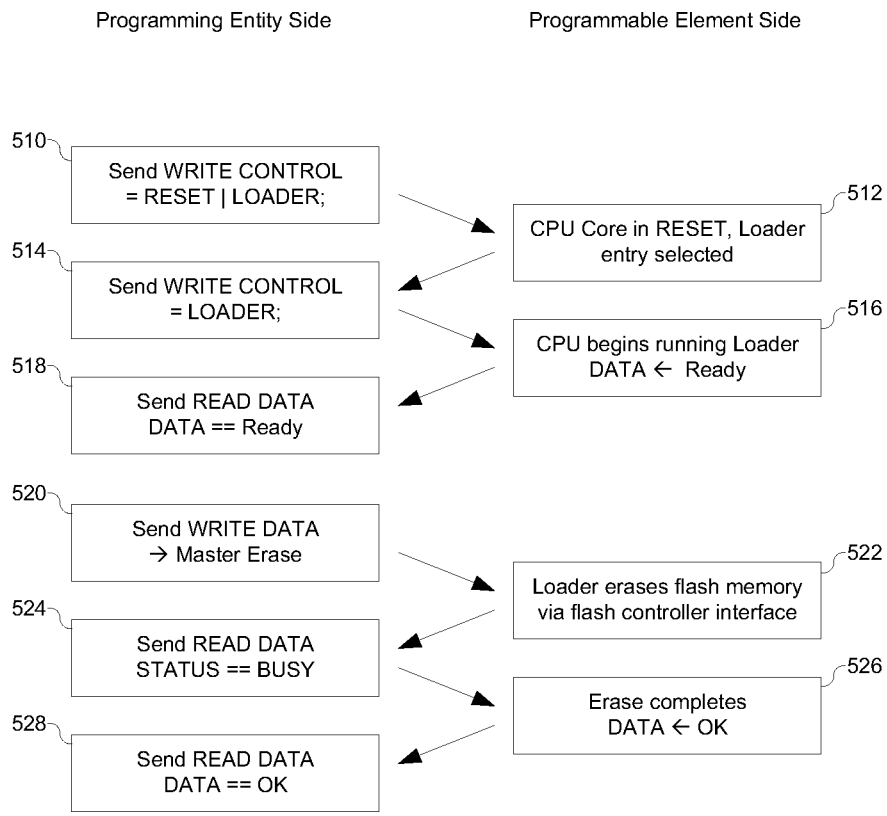
FIG. 5B illustrates an exemplary memory erasing process according to various embodiments of the invention.

FIG. 5B illustrates an exemplary memory erasing process 530 according to various embodiments of the invention. Memory content is erased from the internal memory 214 under a master control from the programming entity 204. A memory loader and a memory controller interface are associated with the internal memory 214, and their statuses are first confirmed during the memory erasing process.

At steps 510 and 514, the programming entity 204 issues two consecutive commands first to reset the execution unit 212 and select the memory loader at step 512, and then to extract loader status to the data register 316 at step 516. At steps 518, the programming entity 204 sends another command to read the data in the data register 316 and confirms readiness for memory loading. At step 520, the programming entity 204 sends a write command of MASTER ERASE, and at step 522, the memory loader erases the memory content in the internal memory 214 via the memory controller interface. Upon completing step 522, the programmable element 202 generates an OK status data to be stored in the data register 316 (step 526). At step 528, the programming entity 204 issues a READ DATA command, receives the OK status data, and confirms that memory erasing is completed. In some embodiments, the programming entity 204 sends a READ DATA command to check whether the memory erasing step 522 is completed (step 524) in the middle of the memory erasing step. A BUSY status data is returned to the programming entity 204.

Figure 5C:
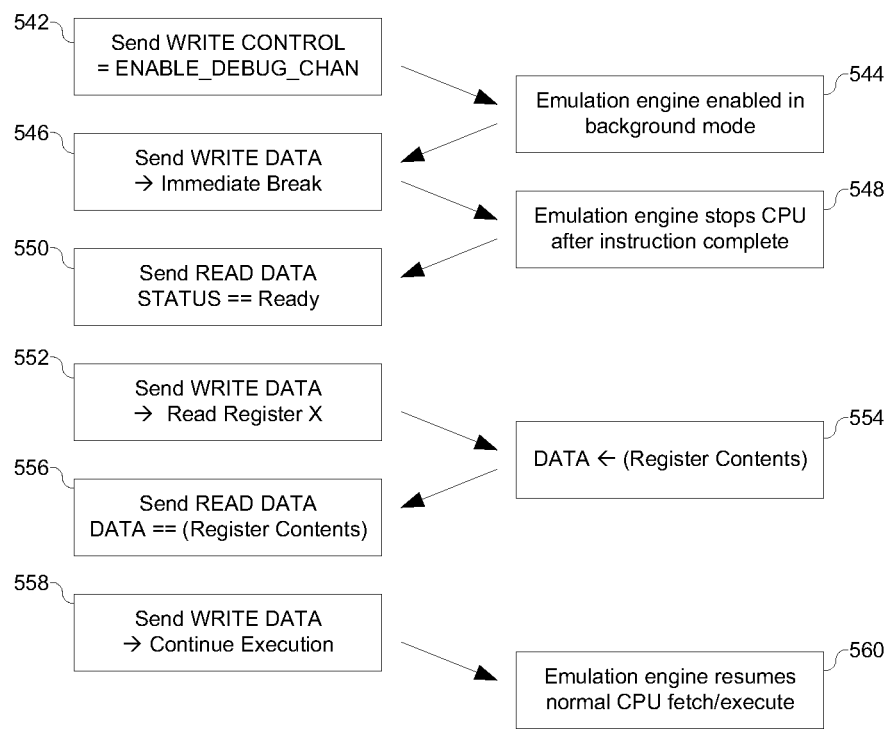
FIG. 5C illustrates an exemplary register reading process according to various embodiments of the invention.

FIG. 5C illustrates an exemplary register reading process 540 according to various embodiments of the invention. Data stored in one register of the CPU interface registers 312 is read under a master control from the programming entity 204. The exemplary register reading process 540 may be used in program debugging to monitor the program status and intermediate data stored in the CPU interface registers 312.

At step 542, the programming entity 204 sends an ENABLE_DEBUG_CHAN command to request the programmable element 202 to run a program stored in the internal memory 214. At step 544, the programmable element 202 enables an emulation engine to implement a background mode, and the emulation engine controls the execution unit 212 to run the program. At steps 546 and 548, the programming entity 204 sends a BREAK command, and the emulation engine subsequently stops the execution unit 212 from running the program. Intermediate data and program status are stored in the CPU interface registers 312. At step 550, the programming entity 204 sends a READ STATUS command to extract the program status data as READY. At step 552, since program suspension is confirmed, a READ REGISTER command is sent to extract the intermediate data to the data register 318. At step 554, the intermediate data are converted to a serial data and returned from the programmable element 202. At step 556, a READ DATA command is issued by the programming entity 204 to receive the serial data that is converted from the intermediate data in the register 318. At steps 558 and 560, the programming entity 204 sends a command to the programmable element 202 to continue debugging using the emulation engine.

Figure 5D:
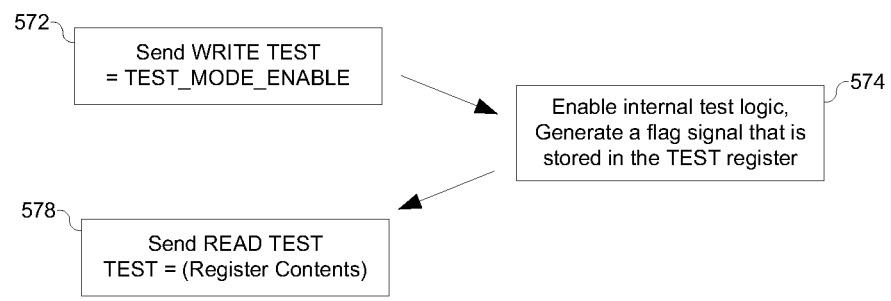
FIG. 5D illustrates an exemplary test entering process according to various embodiments of the invention.

FIG. 5D illustrates an exemplary test entering process 570 according to various embodiments of the invention. The programmable element 202 may contain internal test logic, and this internal test logic may be implemented according to the program codes preloaded to the internal memory 214. In certain embodiments, the program codes are provided by the programming entity 204.

At step 572, the programming entity 204 sends a TEST_MODE_ENABLE command to the programmable element 202 which adopts the associated control signals in the CPU interface registers 312 and enables the internal test logic at step 574. In certain embodiments, the programmable element 202 generates a flag signal indicating whether the internal test logic is implemented properly at step 576. The flag signal is temporarily stored in the test register 320. At step 578, upon receiving a READ TEST command, the programmable entity 202 converts the flag signal in the test register 320 to a serial signal which is sent to the programming entity 204 via the OWL serial signal.

Figure 6:
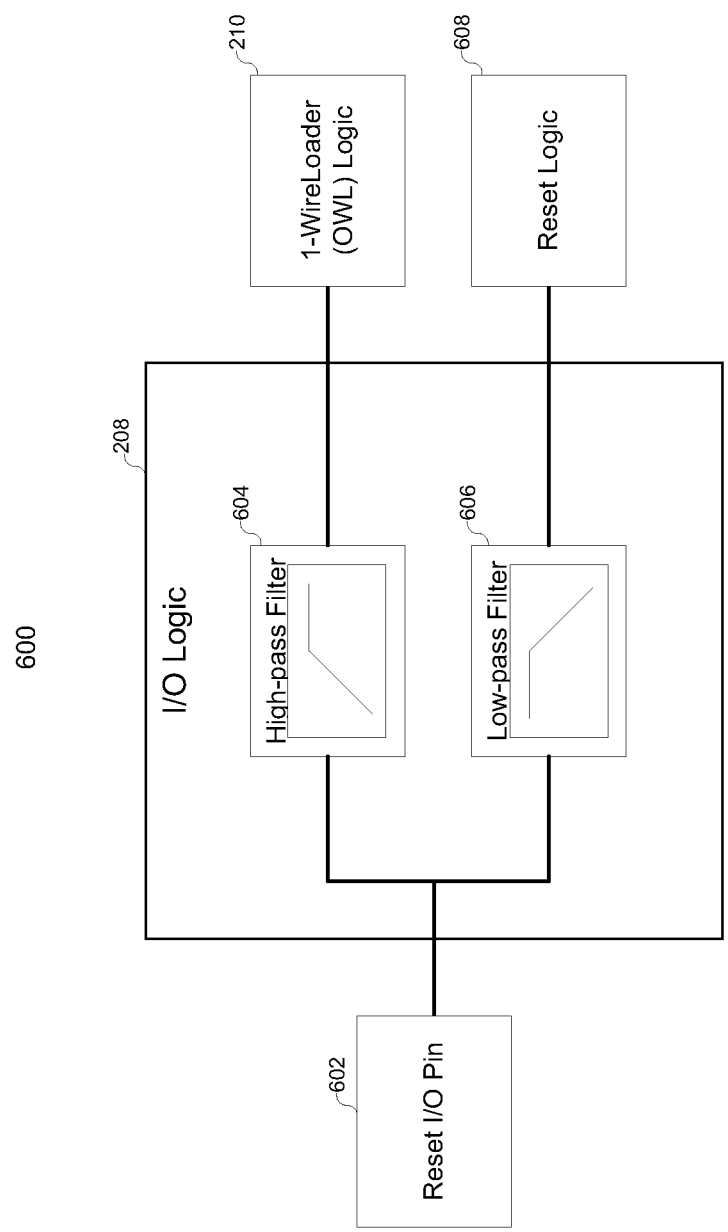
FIG. 6 illustrates an exemplary method of combining the OWL serial signal 222 with an existing I/O pin according to various embodiments of the invention.

The single pin 224 is used at the interface of the programmable element 202, and may be combined with an existing I/O pin to further save the pin count at the interface of the programmable element 204. FIG. 6 illustrates an exemplary method 600 of combining the OWL serial signal 222 with an existing I/O pin according to various embodiments of the invention. In particular, the programmable element normally 202 includes a RESET pin 602 which is used for system reset. In various embodiments of the invention, the OWL serial signal 222 is multiplexed via this existing RESET pin 602 rather than adding one pin specifically allocated for program loading, debugging and testing. This is a novel re-use of the system reset pin which does not affect normal operation nor require extra external circuitry on said pin.

Filters are incorporated in the I/O logic 208 to differentiate the OWL serial signal 222 from a reset signal at the reset I/O pin 602. For system reset, the normal reset signal stays at low for a reset period significantly longer than the length of the identification pulse 408 within the OWL serial signal 222. As a result, a high-pass filter 604 and a low-pass filter 606 are used in the I/O logic 208 to couple the reset pin 602 to the OWL logic 210 and reset logic 608, respectively. The short periods of a low logic level (i.e., an identification pulse 408) on the pin 602 pass through the high-pass filter 604, and are interpreted as the OWL serial signal, while the long periods of low logic level on the pin pass through the low-pass filter 606, and are interpreted as a system reset.

The OWL serial signal carries commands and data for program loading to the internal memory 214 and interactive program debugging in the execution unit 212. When the reset signal is enabled during a program loading or debugging session, the long reset period allows the active session to terminate and return the programmable element 202 to its default state. A special bit is included in the control register 314 to allow a reset process without altering the state of the OWL logic 210.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

We claim:

1. A 1-WireLoader system that loads, debugs or tests program codes for a programmable element via a single-data interface, comprising:
   a programming entity that generates a command sequence and processes a plurality of data, the command sequence comprising a plurality of commands, each command being associated with a data in the plurality of data;
   a physical-layer interface device, coupled to the programming entity and the programmable element, the physical-layer interface device converts the command sequence to a serial signal according to a data sequence protocol;
   a single signal wire, coupled to the physical-layer interface device and the programmable element, the single signal wire couples the serial signal to the programmable element via a single pin at the interface of the programmable element; and
   the programmable element, coupled to the physical-layer interface device, the programmable element receives the serial signal on the single pin, generates control signals, and processes the plurality of data according to the control signals,
   wherein the programmable element further comprising a high-pass filter and a low-pass filter that are used to couple the single pin to a 1-WireLoader logic and a reset logic.

2. The 1-WireLoader system in claim 1, wherein the physical-layer interface device is integrated in the programming entity.

3. The 1-WireLoader system in claim 1, wherein the command sequence comprises at least one command for programming an internal memory in the programmable element, and the physical-layer interface device processes a program code as data associated with the at least one command, and converts the data to the serial signal according to the data sequence protocol.

4. The 1-WireLoader system in claim 1, wherein the command sequence comprises at least one command for reading data from one register in the programmable element, the programmable element outputting the data in the serial signal and the physical-layer interface device converting the serial signal for the programming entity according to the data sequence protocol.

5. The 1-WireLoader system in claim 1, wherein the data sequence protocol comprises:
   an identification phase that identifies the programming entity and the programmable element;
   a selection phase that resets the programmable element for loading, debugging or testing the program codes; and
   a communication phase that comprises a plurality of command phases and a plurality of data phases, each of the plurality of command phases being associated with and followed by one data phase in the plurality of data phases, each of the plurality of command phases being associated with one command in the plurality of commands, each of data phase being associated with one data in the plurality of data.

6. The 1-WireLoader system in claim 5, wherein an identification pulse is issued by the programming entity in the identification phase.

7. The 1-WireLoader system in claim 5, wherein widths of the identification phase, the selection phase, the command phase, the data phase, and the separations between any two consecutive phases are fixed in the data sequence protocol.

8. The 1-WireLoader system in claim 1, wherein the programming entity further comprises a 1-Wire Loader software driver that generates the command sequence and processes the plurality of data.

9. The 1-WireLoader system in claim 1, wherein the programmable element further comprises:
   the single pin, coupled to the single signal wire;
   an I/O logic, coupled to the single pin, the I/O logic pre-processes the serial signal in the programmable element and drives the single pin;
   a read-only memory (ROM) that stores built-in operation programs;
   an internal memory that is programmable to store the program codes;
   a the 1-WireLoader logic, coupled to the I/O logic and an execution unit, the 1-WireLoader logic converts the serial signal to the control signals and data signals, the control and data signals being associated with the plurality of commands and the plurality of data; and
   the execution unit, coupled to the ROM, the internal memory and the 1-WireLoader logic, the execution unit operates according to built-in operation programs in the ROM or control signals from the 1-WireLoader logic.

10. The 1-WireLoader system in claim 9, wherein output data is generated by the execution unit, stored in a register in the 1-WireLoader logic, and subsequently converted by the 1-Wire logic to the serial signal during a read operation associated with a read command for reading data from the register in the 1-WireLoader logic.

11. The 1-WireLoader system in claim 9, wherein the single pin is also a reset I/O pin that is connected with the reset logic to reset the programmable element.

12. The 1-WireLoader system in claim 9, wherein the 1-WireLoader logic further comprises:
   a switch transistor, coupled to a sequence identification/detection logic, the switch transistor receives a switch control and controls the serial signal;
   the sequence identification/detection logic, coupled to the switch transistor, a state machine logic and a serializer/deserializer, the sequence identification/detection logic identifies the programming entity and the programmable element and initializes the command sequence according to the data sequence protocol;
   the state machine logic, coupled to the serializer/deserializer, the sequence identification/detection logic and a multiplexer, the state machine controls the 1-WireLoader system according to the data sequence protocol and generates a data path control and a multiplexer control;
   the serializer/deserializer, coupled to the I/O logic, the state machine logic and the multiplexer, the serializer/deserializer converts the serial signal and parallel signals under the control of the data path control;
   a plurality of CPU interface registers that store the control or data signals; and
   the multiplexer, coupled to the state machine logic, the serializer/deserializer and the plurality of CPU interface registers, the multiplexer is controlled by the multiplexer control to select at least one signal from the parallel signals for storing in the CPU interface registers or select at least one signal from the control and data signals to output to the serializer/deserializer.

13. A method of loading, debugging or testing program codes for a programmable element via a single-wire data interface, comprising the steps of:
    identifying a programming entity and the programmable element, flag signals being exchanged via the single-wire data interface between the programming entity and the programmable element;
    selecting and configuring the programmable element via the single-wire data interface;
    generating a command by the programming entity;
    converting the command to a serial signal;
    transmitting the serial signal via the single-wire data interface to the programmable element;
    processing the serial signal to extract control signals associated with the command in the programmable element;
    associating the control signals with a data, the data being converted to the serial signal; and
    communicating the serial signal between the programming entity and the programmable element via the single-wire data interface; and
    filtering the serial signal with a high-pass filter to generate a second serial signal; and filtering the serial signal with a low-pass filter to extract a system reset signal.

14. The method in claim 13, wherein a data sequence protocol is followed to define the single-wire data interface and the serial signal, the data sequence protocol defining timing characteristics of the serial signal.

15. The method in claim 13, wherein the command is associated with a program loading operation, the data being associated with the program codes to be loaded into an internal memory in the programmable element, the command and the data being sequentially time-multiplexed on the serial signal, the data being delivered from the programming entity to the programmable element via the single-wire data interface.

16. The method in claim 13, wherein the command is associated with a read operation in which the data are read from CPU internal registers in the programmable element, the command and the data being time-multiplexed on the serial signal, the data being delivered from the programmable element to the programming element via the single-wire data interface.

17. The method in claim 16, wherein the data is selected from a group consisting of intermediate data, program status and system configurations during a process that is selected from a group consisting of programming, debugging or testing the programmable element.

18. The method in claim 13, wherein a single pin is located at the interface of the programmable element to receive the serial signal, the single pin being also used as a reset I/O pin to receive the system reset signal for resetting the programmable element.

19. The method in claim 18, wherein the step of processing the serial signal to extract control signals associated with the command in the programmable element further comprises step of
    converting the second serial signal to the control signals.

20. A method of controlling a programmable element via a single-wire data interface, comprising the steps of:
    generating a plurality of commands in a programming entity, each command in the plurality of commands being selected from a group consisting of a write command or a read command;
    associating a plurality of data with the plurality of commands, each command the plurality of commands being associated with a data in plurality of data;
    time-multiplexing the plurality of commands and the plurality of data to a serial signal, each command being followed by its associated data;
    communicating the serial signal between the programming entity and the programmable element via the single-wire data interface, wherein a single pin located at the interface of the programmable element receives the serial signal and generates 1-WireLoader logic signal and a system reset signal;
    extracting a plurality of control signals from the serial signal, each control signal in the plurality of control signals being associated with one command in the plurality of commands;
    controlling the programmable element according to the plurality of control signals; and
    wherein a write command is associated with a data generated by the programming entity, and a read command is associated with a data generated by the programmable element.

21. The method in claim 20, wherein a data sequence protocol is followed to define the single-wire data interface and the serial signal, the data sequence protocol defining widths of each command and associated data, separation between consecutive command and data, bit width, rising edges and falling edges for the serial signal.

22. The method in claim 20, wherein for the write command and the data associated with the write command, the serial signal being transferred from the programming entity to the programmable element and converted to data signals.

23. The method in claim 20, wherein for the read command and the data associated with the read command, the data being generated by the programmable element, converted to the serial signal, and transferred from the programmable element to the programming entity for further analysis.

* * * * *